(12) United States Patent
Briant et al.

(10) Patent No.: US 6,367,766 B1
(45) Date of Patent: Apr. 9, 2002

(54) PROPORTIONAL FLOW VALVE

(76) Inventors: Robert Briant, 81A Waterman St., Manchester, NH (US) 03049; Wayne Pascoal, 229 Peak St., Manchester, NH (US) 03104; James A. Burns, 5 Spruce St., Merrimack, NH (US) 03054

( * ) Notice: Subject to any disclaimer, the term of this patent is extended or adjusted under 35 U.S.C. 154(b) by 0 days.

(21) Appl. No.: 09/564,150

(22) Filed: May 3, 2000

Related U.S. Application Data

(60) Provisional application No. 60/143,024, filed on Jul. 9, 1999.

(51) Int. Cl.[7] .............................................. F16K 31/02
(52) U.S. Cl. ............................ 251/129.02; 251/129.08; 251/129.15
(58) Field of Search ........................ 251/129.07, 129.08, 251/129.15, 129.17, 129.02

(56) References Cited

U.S. PATENT DOCUMENTS

| | | | |
|---|---|---|---|
| 3,071,147 A | * | 1/1963 | Dudzinski |
| 4,312,380 A | | 1/1982 | Leiber et al. ............. 137/627.5 |
| 5,232,196 A | | 8/1993 | Hutchings et al. ...... 251/129.08 |
| 5,487,407 A | * | 1/1996 | Eaker ......................... 137/522 |
| 5,865,421 A | | 2/1999 | Ono ........................ 251/129.02 |
| 6,142,183 A | * | 11/2000 | Karthaeuser ............. 137/627.5 |
| 6,161,539 A | * | 12/2000 | Winter .................... 128/205.24 |
| 6,257,445 B1 | * | 7/2001 | Means et al. ................... 222/1 |
| 6,626,351 | * | 7/2001 | Parsons et al. ................. 4/313 |

FOREIGN PATENT DOCUMENTS

| | | |
|---|---|---|
| DE | 3244297 | 11/1982 |
| FR | 1249078 | 11/1960 |
| FR | 2461868 | 6/1981 |
| GB | 2089478 | 12/1980 |

* cited by examiner

Primary Examiner—Kevin Shaver
Assistant Examiner—D A Bonderer

(57) ABSTRACT

A proportional flow valve wherein a solenoid assembly moves an armature assembly towards a valve seat in proportion to the flow of current through the solenoid assembly. The armature assembly abuttingly engages a seal to hold the seal away from the valve seat at a distance correspondingly proportionally related to the applied current. In this manner, the seal is movable towards and away from the valve seat among a fully open position, a closed position, and partially open positions therebetween. A spring assembly biases the seal towards the valve seat and, when the solenoid assembly is energized, the armature assembly allows the spring assembly to seat the seal against the valve seat to place it in the closed position.

37 Claims, 3 Drawing Sheets

PROPORTIONAL FLOW VALVE

RELATED APPLICATIONS

This application claims priority under 35 U.S.C. §119(e) to U.S. Provisional Patent Application No. 60/143,024 filed on Jul. 9, 1999. The entire disclosure of this provisional application is hereby incorporated by reference.

FIELD OF THE INVENTION

This invention relates generally as indicated to a proportional flow valve and more particularly to a normally-open solenoid controlled flow valve.

BACKGROUND OF THE INVENTION

A proportional flow valve allows the flow through the valve to be controllably varied as compared to, for example, a standard valve that is either completely open or completely closed. Such a flow valve may include a seal which moves among a closed position whereat it is seated against a valve seat, a fully open position whereat it is removed from the valve seat a predetermined distance, and partially open (or partially closed) positions whereat it is removed from the valve seat lesser distances. In a solenoid controlled proportional valve, an armature assembly will move the seal, in proportion to the current applied to the solenoid assembly, to selectively change the position of the seal.

A solenoid controlled proportional flow valve is shown in U.S. Pat. No. 5,232,196 to Hutchings et al. (This patent is assigned to the assignee of the present application and its entire disclosure is hereby incorporated by reference.) The valve disclosed in the Hutchings patent is a normally closed solenoid valve wherein an armature assembly holds an elastomeric seal in a closed position when the solenoid assembly is de-energized. The seal is attached to an end of the armature assembly and a spring is positioned between the end of the armature assembly and the seal. This spring-loaded seal configuration helps to compensate for dimensional changes in the elastomeric seal material due to swell and temperature variations.

The normally closed proportional solenoid valve disclosed in the Hutchings patent performs well in many valve situations. However, in other situations, a normally open proportional valve may be more advantageous. For example, in situations where a valve remains fully open most of the time and is only occasionally closed (partially or fully), a normally open valve would allow the solenoid to be energized only during the short periods when the valve is not fully open. For another example, in situations where it is required that the valve remain open during a power outage, a normally open proportional valve meets this requirement without the incorporation of any further failsafe features.

SUMMARY OF THE INVENTION

The present invention provides a proportional solenoid controlled flow valve design which is compatible with a normally open arrangement wherein the valve remains fully open unless the solenoid is energized. In this manner, the valve may be used in those situations where a normally open proportional valve is more advantageous than, for example, a normally closed proportional valve.

More particularly, the present invention provides a proportional flow valve comprising a valve body, a seal, a solenoid assembly, and an armature assembly. The valve body includes an inlet, an outlet and a valve seat defining an orifice therebetween. The seal is movable towards and away from the valve seat to a fully open position, a fully closed position, and partially open positions therebetween. The armature assembly is movable at least partially within the solenoid assembly when current is applied to the solenoid. The solenoid assembly moves the armature assembly in proportion to the flow of current and the armature assembly abuttingly engages the seal in the open positions to hold the seal away from the valve seat a distance correspondingly proportionally related to the applied current.

The valve body preferably includes a passageway between the inlet and the outlet and the valve seat is located at one end of the passageway, preferably the end of the passageway adjacent the inlet. An inlet chamber and an outlet chamber are preferably arranged in the valve body so that fluid flows through the inlet to the inlet chamber, through the passageway, into the outlet chamber and through the outlet when the seal is in one of its open positions. The seal is preferably positioned within the inlet chamber so that fluid is blocked from entering the passageway when the seal is in the closed position.

The armature assembly preferably includes a plunger portion and a pin portion. The plunger portion interacts with the solenoid assembly. The pin portion abuttingly engages the seal and extends through the passageway and into the inlet chamber when the seal is in the open positions. The armature assembly additionally or alternatively preferably includes a biasing member which is arranged to resist movement of the armature assembly away from the valve seat. This biasing member may be an annular flat spring positioned adjacent and/or around the armature assembly.

The proportional flow valve preferably further comprises a spring assembly which biases the seal towards the valve seat and the armature assembly allows the spring assembly to seat the seal against the valve seat when in the closed position. The spring assembly preferably includes a spring contained within the valve body, and more preferably a conical spring coaxially aligned with a passageway between the inlet and the outlet.

These and other features of the invention are fully described and particularly pointed out in the claims. The following description and drawings set forth in detail a certain illustrative embodiment of the invention, these embodiments being indicative of but one of the various ways in which the principles of the invention may be employed.

DETAILED DESCRIPTION

Figure 1:
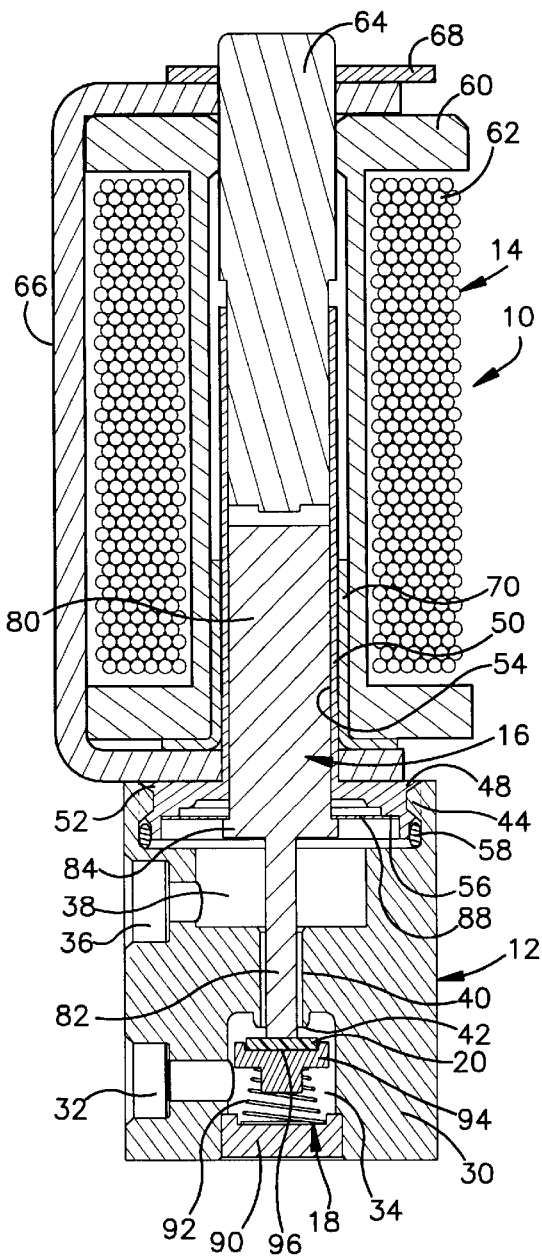
FIG. 1 is a cross-sectional view of a proportional flow valve according to the present invention, the valve being shown in a fully open condition.
Figure 2:
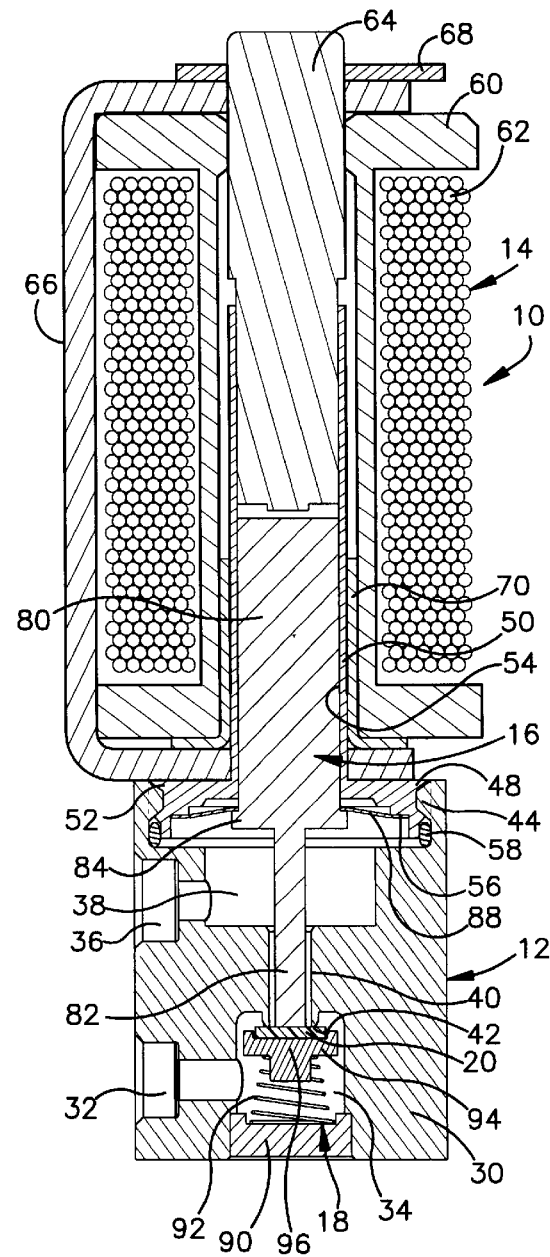
FIG. 2 is another cross-sectional view of the flow valve, the valve being shown in a closed condition.

Referring now in detail to the drawings, and initially to FIGS. 1 and 2, a proportional flow valve 10 according to the present invention is shown. The valve 10 comprises a casing assembly 12, a solenoid assembly 14, an armature assembly 16, a spring assembly 18, and a seal 20. As is explained in more detail below, the assemblies 12, 14, 16 and 18 coordinate to move the seal 20 among a fully open position (FIG. 1), a closed position (FIG. 2), and partially open positions therebetween in proportion to the flow of current applied to the solenoid assembly 14.

The casing assembly 12 includes a valve body 30 that defines the flow passageways of the valve 10. Specifically, the valve body 30 defines an inlet passageway 32 leading to an inlet chamber 34, an outlet passageway 36 leading from an outlet chamber 38, and a passageway 40 between the inlet and outlet chambers 34 and 38. The valve body 30 additionally includes a valve seat 42 defining an orifice at the end of the passageway 40 opening to the inlet chamber 34. An inner surface of the valve body 30 includes a threaded bore 44 that communicates with the outlet chamber 38.

When the valve 10 is in its normally fully open condition (FIG. 1), the seal 20 is in its fully open position whereat it is a predetermined distance away from the valve seat 42. The fluid may thereby flow through the inlet passageway 32 into chamber 34, through the "unblocked" passageway 40, to the outlet chamber 38 and through the outlet passageway 36. When the valve 10 is in its closed condition (FIG. 2), the seal 20 is in its closed position whereat it is seated against the valve seat 42. Fluid is thereby blocked from flowing from the inlet chamber 34 through the passageway 40 to the outlet chamber 38 and outlet passageway 36.

The casing assembly 12 additionally includes a stem 48 that connects the valve body 30 to the solenoid assembly 14. To this end, the stem 48 includes an inner portion 50 and an outer portion 52. The inner stem portion 50 is tube-shaped and is connected to a portion of the solenoid assembly 14. The outer stem portion 52 is roughly disk-shaped and is externally threaded to interface with the threaded bore 44 of the valve body. The inner stem portion 50 and outer stem portion 52 form an internal cylindrical bore 54 that slidingly receives a portion of the armature assembly 16 (namely a plunger portion 80, introduced below) and communicates with the outlet chamber 38. The outer end of the bore 54 expands into a stepped profile forming inverted ledges 56. Alternatively (but not shown in the drawings), the outer end of the bore 54 could expand into a sloped profile forming inverted ramps. An O-ring 58 may be provided between the stem portion 52 and the valve body bore 44.

The solenoid assembly 14 includes a bobbin 60, a magnetic coil 62, a pole piece 64, and a yoke 66. The bobbin 60 defines an outer annular chamber in which the magnetic coil 62 is contained. The bobbin 60 also defines a central cylindrical opening in which the pole piece 64 is contained and also the inner stem portion 50. The yoke 66 includes outer and inner arms with respective openings through which the pole piece 64 and the stem 48 extend, respectively. A flat compression C-ring 68 surrounds the outer end of the pole piece 64 to retain the yoke 66 to the bobbin 60 and the magnetic coil 62. A flux concentrator 70 may be provided to concentrate and transmit magnetic flux.

The metallic armature assembly 16 includes an outer plunger portion 80 and an inner pin portion 82. The cylindrical plunger portion 80 is slidingly received within the stem's internal bore 54 and thus is positioned within the bobbin's central opening below the pole piece 64. The pin portion 82 extends from the plunger portion 80 and through the inlet-outlet passageway 40. The bottom edge of the plunger portion 80 is flanged to form a ledge 84.

The armature assembly 16 additionally includes a spring 88 which is preferably of the type described in U.S. Pat. No. 5,232,196, and specifically a three-lobed annular flat spring. The spring 88 is supported between the stem's inverted ledge 56 and the armature's ledge 84 and regulates the displacement of the armature assembly portions 80 and 82 by providing resistance to the force induced by the solenoid assembly 14.

When current or voltage is applied to the solenoid assembly 14 (i.e., the magnetic coil 62 is energized) the coil magnetomotive force induces a flux through the yoke 66 and the pole piece 64 across a working gap, through the armature assembly 16, and back to the yoke 66 via the flux concentrator 70. This magnetic flux induces a force of attraction between the armature plunger portion 80 and the pole piece 64, causing the armature assembly 16 to move toward the pole piece 64 thereby causing the armature pin portion 82 to move relative to the passageway 40 in a closing direction. (Compare FIGS. 3 and 4.) Increasing the coil current increases the force of attraction between the armature assembly 16 and the pole piece 64 thereby increasing the movement of the armature assembly 16 towards the pole piece 64 against the biasing force exerted by the spring 88 and thereby increasing the movement of the pin portion 82 relative to the passageway 40. As will be appreciated, the position of the pin portion 82 may be proportionally related to the coil current, as is typical of proportional solenoid controlled valves.

The spring assembly 18 comprises a plug 90, a conical spring 92, and a carrier 94. The plug 90 is fixed within the bottom of the inlet chamber 34, the bottom end of the spring 92 sits within a pocket on the top of the plug 90, and the carrier 94 is supported on top of the spring 92. The carrier 94 includes a circular indent or dish 96 in which the seal 20 is contained. It may be noted that the seal 20 and/or the spring assembly 18 are not attached to the armature assembly 16.

The mounting/supporting of the seal 20 is arranged so that the spring 92 and the carrier 94 are in a coaxial relationship with the armature pin portion 82 and/or the inlet-outlet passageway 40. The preferred spring 92 is a conical spring as this spring geometry has proven to better maintain this desired coaxial relationship. Thus, regardless of the position of the armature assembly 16, the spring assembly 18 biases the seal towards its closed position. (See FIGS. 3 and 4.)

Figure 3:
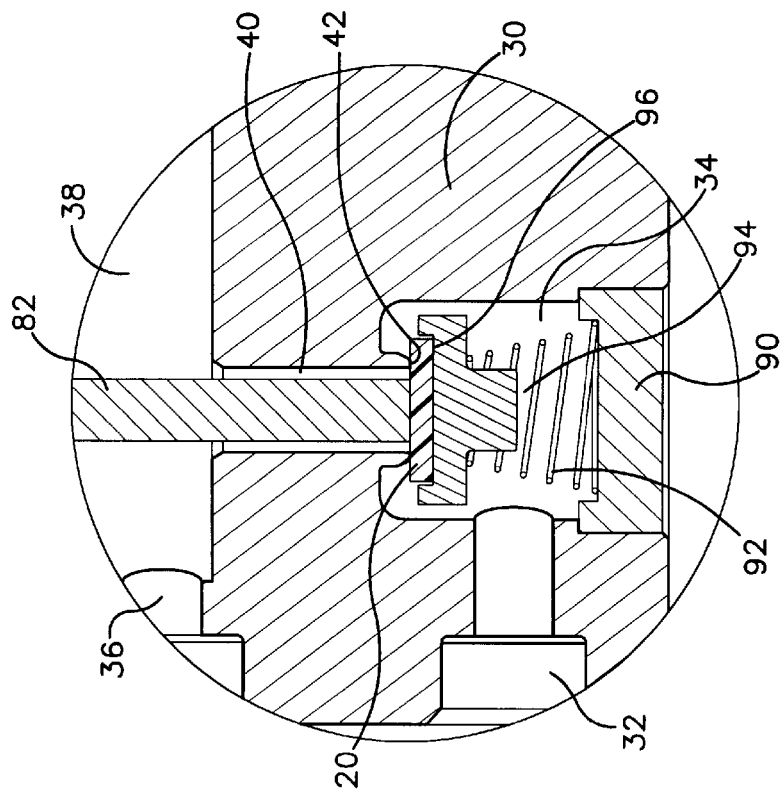
FIG. 3 is an enlarged view of the valve seat and surrounding portions of the valve in the fully open condition.

When the solenoid assembly 14 is de-energized, the valve 10 is in its normally fully-open condition, and the armature assembly 16 abuttingly engages the seal 20 to hold the seal in its fully open position. (FIGS. 1 and 3). More particularly, the armature pin portion 82 extends a predetermined distance beyond the valve seat 42 thereby holding the seal 20 this distance away from the valve seat 42. Fluid may then pass through the inlet passageway 32, into the inlet chamber 34, around the seal 20, through the inlet-outlet passageway 40, into the outlet chamber 38 and through the outlet passageway 36.

Figure 4:
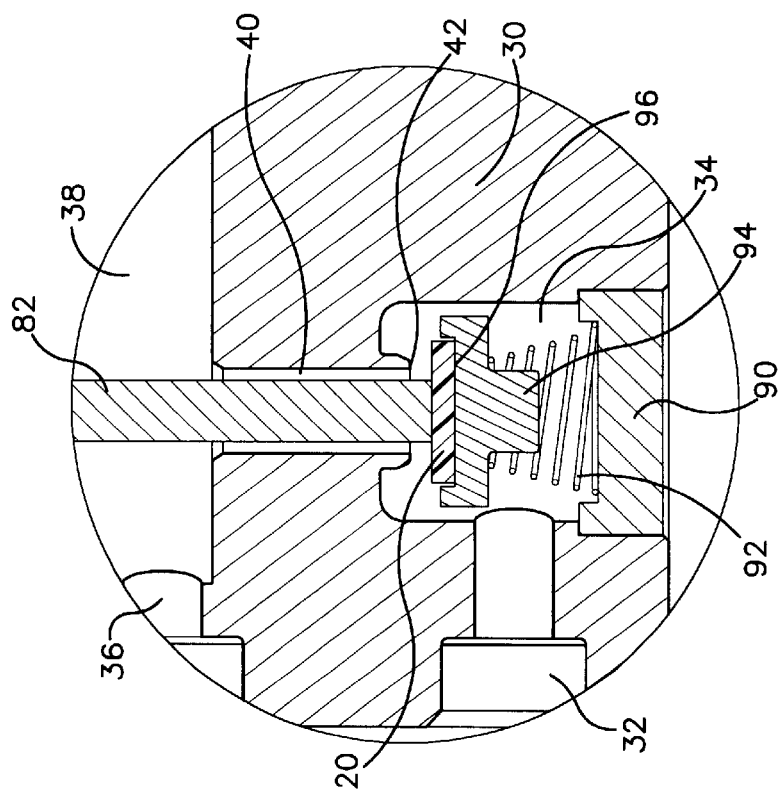
FIG. 4 is an enlarged view of the valve seat and surrounding portions of the valve in the closed condition.

When the solenoid assembly 14 is fully energized, the armature assembly 16 is pulled back sufficiently to allow the seal 20 to move into engagement with the valve seat 42 under the action of the spring assembly 18 and/or fluid pressure, thereby fully closing the valve. (FIGS. 2 and 4.) More particularly, the armature pin portion 82 does not extend beyond the valve seat 42.

The valve 10 may also be placed in a plurality of partially-open conditions (or partially closed conditions) by increasing/decreasing the current through the solenoid assembly 14. Specifically, increasing the coil current proportionally increases the movement of the armature plunger portion 80 towards the pole piece 64. This in turn proportionally decreases the distance that armature pin portion 82 extends beyond the bottom end of the passageway 40 thereby proportionally decreasing the distance between the seal 20 and the valve seat 42. The less the distance, the less fluid flowing through the passageway 40 and the less the output of the valve 10. That is, precise flow regulation can be obtained by changing the curtain area or flow gap between the seal and valve seat, this changing the effective orifice size.

Figure 6:
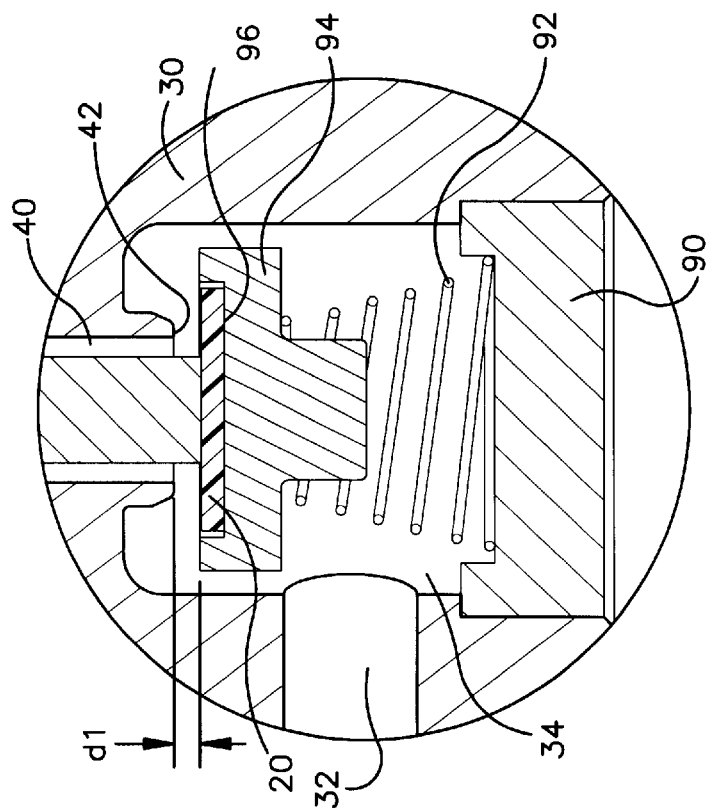
FIG. 6 is an enlarged view of the valve seat and surrounding portions of the valve in the fully open condition, the seal being shown in a contracted or shrunken state.
Figure 5:
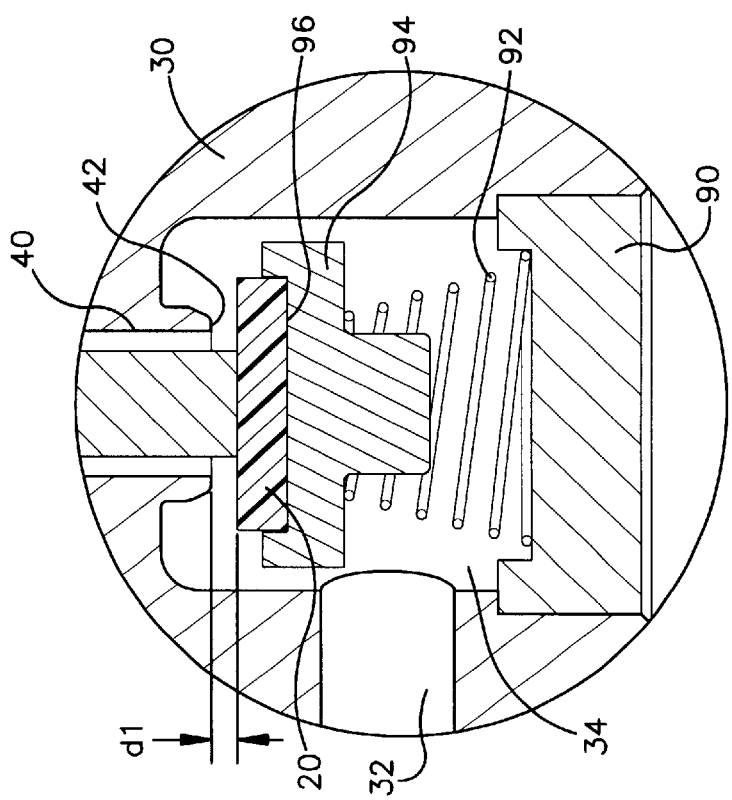
FIG. 5 is an enlarged view of the valve seat and surrounding portions of the valve in the fully open condition, the seal being shown in an expanded or swelled state.

The design of the proportional flow valve 10 allows it to compensate for thermal changes in the seal 20. The seal 20, which is typically made of an elastomer, may expand (e.g., swell) at increased temperatures (FIG. 5) and contract (e.g., shrink) at decreased temperatures (FIG. 6). The design of the valve 10 is such that seal expansion or seal contraction will not significantly affect the flow characteristics of the valve. Specifically, the flow characteristics of the valve 10 are determined by the distance between the valve seat 42 and the top surface of the seal 20 whereby the spring 92 absorbs or extends to compensate for the dimensional change of the elastomer.

One may now appreciate that the present invention provides a proportional solenoid-controlled flow valve design which is compatible with a normally open arrangement wherein the valve 10 remains fully open unless the solenoid assembly 14 is energized. In this manner, the valve 10 may be used in those situations where a normally open proportional valve is more advantageous than, for example, a normally closed proportional valve.

Although the invention has been shown and described with respect to a certain preferred embodiment, it is obvious that equivalent and obvious alterations and modifications will occur to others skilled in the art upon the reading and understanding of this specification. The present invention includes all such alternations and modifications and is limited only by the scope of the following claims.

What is claimed:

1. A proportional flow valve comprising:
   a valve body including an inlet, an outlet, and a valve seat defining an orifice therebetween;
   a seal movable towards and away from the valve seat to a fully open position, a closed position, and partially open positions therebetween,
   a solenoid assembly through which current is applied and which includes a pole piece, and
   an armature assembly movable at least partially within the solenoid assembly when current is applied to the solenoid assembly;
   wherein the solenoid assembly moves the armature assembly towards the pole piece in proportion to the flow of current through the solenoid assembly;
   wherein the armature assembly abuttingly engages the seal in the open positions to hold the seal away from the valve seat at a distance inversely proportional related to the applied current; and
   wherein the seal is in the fully open position when the solenoid assembly is non-energized.

2. A proportional flow valve as set forth in claim 1 wherein the armature assembly includes a pin portion that abuttingly engages the seal in the open positions.

3. A proportional flow valve as set forth in claim 1 wherein the valve body includes a passageway between the inlet and the outlet and wherein the valve seat is located at one end of the passageway.

4. A proportional flow valve as set forth in claim 3 wherein the valve seat is located at the end of the passageway adjacent the inlet.

5. A proportional flow valve as set forth in claim 4 wherein the valve body includes an inlet chamber and an outlet chamber arranged so that fluid flows through the inlet to the inlet chamber, through the passageway, into the outlet chamber and through the outlet when the seal is in one of its open positions.

6. A proportional flow valve as set forth in claim 5 wherein the seal is positioned within the inlet chamber so that fluid is blocked from entering the passageway when the seal is in the closed position.

7. A proportional flow valve as set forth in claim 6 wherein the armature assembly includes a plunger portion that interacts with the solenoid assembly and a pin portion that abuttingly engages the seal and extends through the passageway and into the inlet chamber a distance correspondingly proportionally related to the applied current to place the seal in the open positions.

8. A proportional flow valve as set forth in claim 7 wherein the armature assembly includes a biasing member which is arranged to resist movement of the armature assembly towards the valve seat.

9. A proportional flow valve as set forth in claim 8 wherein the biasing member is a spring positioned around the armature assembly.

10. A proportional flow valve as set forth in claim 9 wherein the spring is an annular flat spring.

11. A proportional flow valve as set forth in claim 6 further comprising a spring assembly which biases the seal towards the valve seat and which includes a spring positioned within the valve body.

12. A proportional flow valve as set forth in claim 11 wherein the spring comprises a conical spring.

13. A proportional flow valve as set forth in claim 12 wherein the spring assembly further comprises a carrier mounted to an end of the conical spring and wherein the seal is contained by the carrier.

14. A proportional flow valve as set forth in claim 13 wherein the conical spring is coaxially aligned with the passageway.

15. A proportional flow valve as set forth in claim 7, wherein, when the seal is in the closed position, the pin portion of the armature assembly does not extend beyond the valve seat.

16. A proportional flow valve as set forth in claim 7, wherein the solenoid assembly further comprises a bobbin defining a central opening in which the pole piece is contained and wherein the plunger portion is slidingly received within the central opening of the bobbin.

17. A proportional flow valve as set forth in claim 1 wherein the armature assembly includes a biasing member which is arranged to resist movement of the armature assembly towards the valve seat.

18. A proportional flow valve as set forth in claim 17 wherein the biasing member is a spring positioned adjacent the armature assembly.

19. A proportional flow valve as set forth in claim 18 wherein the spring is an annular flat spring.

20. A proportional flow valve as set forth in claim 1 further comprising a spring assembly which biases the seal towards the valve seat and which includes a resilient member positioned within the valve body.

21. A proportional flow valve as set forth in claim 20 wherein the resilient member comprises a conical spring positioned within the valve body.

22. A proportional flow valve as set forth in claim 21 wherein the spring assembly further comprises a carrier mounted to an end of the conical spring and wherein the seal is contained by the carrier.

23. A proportional flow valve as set forth in claim 22 wherein the conical spring is coaxially aligned with the passageway.

24. A proportion flow valve as set forth in claim 1, wherein the pole piece is aligned with the armature assembly and has a working gap therebetween and wherein the flow of current through the solenoid assembly causes the armature assembly to move towards the pole piece thereby reducing the length of the working gap.

25. A proportional flow valve as set forth claim 24, wherein the solenoid assembly further comprises a bobbin defining a central opening in which the pole piece is contained and in which a plunger portion of the armature assembly is slidingly received.

26. A proportional flow valve as set forth in claim 1, further comprising a stem which connects the valve body to the solenoid assembly and wherein the stem has an internal bore that slidingly receives a plunger portion of the solenoid assembly and communicates with the outlet.

27. A proportional flow valve comprising:
  a valve body including an inlet, an outlet, and a valve seat defining an orifice therebetween;
  a seal movable towards and away from the valve seat to a fully open position, a closed position, and partially open positions therebetween,
  a solenoid assembly through which current is applied and which inludes a pole piece, and
  an armature assembly movable at least partially within the solenoid assembly when current is applied to the solenoid assembly;
    wherein the solenoid assembly moves the armature assembly towards the pole piece in proportion to the flow of current through the solenoid assembly; and
    wherein the armature assembly abuttinaly engages the seal in the open positions to hold the seal away from the valve seat at a distance inversely proportional to the applied current; and
    wherein the seal has a planar surface which, when the seal is in the closed position, contacts the valve seat and extends across the orifice defined thereby.

28. A proportional flow valve as set forth in claim 27 wherein the seal has a cylindrical shape with one axial end forming the planar surface.

29. A proportional flow valve as set forth in claim 28, further comprising a carrier in which the seal sits and which is resiliently connected to the valve body.

30. A proportional flow valve as set forth in claim 27 wherein flow characteristics are determined by a distance between the valve seat and the planar surface of the seal.

31. A proportional flow valve as set forth in claim 30 wherein a spring assembly biases the seal towards the valve seat and wherein the spring assembly contracts/extends to compensate for dimensional changes of the seal so that the distance between the valve seat and the planar surface of the seal remain substantially unchanged.

32. A proportional flow valve as set forth in claim 31 wherein the seal is made of an elastomer material.

33. A proportional flow valve as set forth in claim 32 wherein the seal has a cylindrical shape with one axial end forming the planar surface.

34. A proportional flow valve as set forth in claim 31 wherein the armature assembly includes a pin portion in direct contact with the seal.

35. A proportional flow valve as set forth in claim 31 wherein there is no intervening member between the armature assembly and the seal.

36. A proportional flow valve as set forth in claim 1, wherein, when the seal is in the closed position, the valve is fully closed.

37. A proportional flow valve comprising:
  a valve body including an inlet, an outlet, and a valve seat defining an orifice therebetween;
  a seal movable towards and away from the valve seat to a fully open position, a closed position, and partially open positions therebetween,
  a solenoid assembly through which current is applied and which includes a pole piece, and
  an armature assembly movable at least partially within the solenoid assembly when current is applied to the solenoid assembly;
    wherein the solenoid assembly moves the armature assembly towards the pole piece in proportion to the flow of current through the solenoid assembly;
    wherein the armature assembly abuttingly engages the seal in the open positions to hold the seal away from the valve seat at a distance inversely proportional related to the applied current; and
    wherein the valve further comprises a spring assembly which biases the seal towards the valve seat and wherein the armature assembly allows the spring assembly to seat the seal against the valve seat in the closed position.

* * * * *